United States Patent
Luo et al.

(10) Patent No.: US 12,423,899 B2
(45) Date of Patent: Sep. 23, 2025

(54) METHOD AND DEVICE FOR CONTROLLING BOOT DISPLAY, AND NON-VOLATILE COMPUTER-READABLE STORAGE MEDIUM

(71) Applicants: CHERY AUTOMOBILE CO., LTD., Wuhu (CN); LION AUTOMOTIVE TECHNOLOGIES NANJING CO., LTD., Nanjing (CN); WUHU LION AUTOMOTIVE TECHNOLOGIES CO., LTD., Wuhu (CN)

(72) Inventors: Hui Luo, Wuhu (CN); Lei Liu, Wuhu (CN); Jihao Zhong, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 199 days.

(21) Appl. No.: 18/257,282

(22) PCT Filed: Dec. 20, 2021

(86) PCT No.: PCT/CN2021/139791
§ 371 (c)(1),
(2) Date: Jun. 13, 2023

(87) PCT Pub. No.: WO2022/135354
PCT Pub. Date: Jun. 30, 2022

(65) Prior Publication Data
US 2024/0013466 A1    Jan. 11, 2024

(30) Foreign Application Priority Data
Dec. 25, 2020 (CN) .......................... 202011565598.0

(51) Int. Cl.
*G06T 13/80* (2011.01)
*G06F 3/14* (2006.01)
*G06F 9/30* (2018.01)

(52) U.S. Cl.
CPC ............ *G06T 13/80* (2013.01); *G06F 3/1438* (2013.01); *G06F 9/3009* (2013.01)

(58) Field of Classification Search
CPC ..... G06T 13/80; G06F 3/1438; G06F 9/3009; H04N 21/4312; H04N 21/443; H04N 21/41422; H04N 21/4307
See application file for complete search history.

(56) References Cited

U.S. PATENT DOCUMENTS

| | | | |
|---|---|---|---|
| 2012/0133658 A1* | 5/2012 | Mori ....................... | G06T 13/80 345/473 |
| 2017/0203653 A1* | 7/2017 | Ogasawara ............... | G06T 3/60 |

(Continued)

FOREIGN PATENT DOCUMENTS

| | | |
|---|---|---|
| CN | 103544048 A | 1/2014 |
| CN | 103903542 A | 7/2014 |

(Continued)

OTHER PUBLICATIONS

European Patent Office, Extended or Supplementary European Search Report pursuant to Rule 62 EPC, dated Feb. 29, 2024 in Patent Application No. 21909350.7, which is a foreign counterpart to this U.S. Application.

(Continued)

*Primary Examiner* — Michael Le
(74) *Attorney, Agent, or Firm* — Kolitch Romano Dascenzo Gates LLC

(57) ABSTRACT

Provided is a method for controlling boot display. The method includes: acquiring configuration information of a vehicle in response to receiving a start-up signal of the vehicle; determining a display mode matching the configuration information; acquiring a boot animation correspond- (Continued)

ing to the display mode; and driving a screen of the vehicle to display the boot animation in accordance with the display mode.

15 Claims, 5 Drawing Sheets

(56) References Cited

U.S. PATENT DOCUMENTS

| | | | | |
|---|---|---|---|---|
| 2018/0018083 A1* | 1/2018 | Cengil | ................ | G06F 3/04847 |
| 2020/0339174 A1* | 10/2020 | Sakamaki | .............. | B62D 1/046 |
| 2021/0072943 A1* | 3/2021 | Enokida | ................ | B60K 35/26 |

FOREIGN PATENT DOCUMENTS

| | | | | | |
|---|---|---|---|---|---|
| CN | 106891830 A | * | 6/2017 | ......... | B60R 16/0231 |
| CN | 108446142 A | | 8/2018 | | |
| CN | 109491624 A | | 3/2019 | | |
| CN | 110489072 A | * | 11/2019 | ........... | G06F 3/1423 |
| CN | 111198666 A | | 5/2020 | | |
| CN | 111976479 A | | 11/2020 | | |
| CN | 112099863 A | | 12/2020 | | |
| CN | 112714343 A | | 4/2021 | | |
| JP | 2005141548 A | | 6/2005 | | |

OTHER PUBLICATIONS

International Search Report of the International Searching Authority for State Intellectual Property Office of the People's Republic of China in PCT application No. PCT/CN2021/139791 issued on Mar. 22, 2022, which is an international application to which this application claims priority.

China National Intellectual Property Administration, Notification to Grant Patent Right for Invention of Chinese Application No. 202011565598.0 issued on May 10, 2022, which is foreign counterpart application of this US application.

* cited by examiner

METHOD AND DEVICE FOR CONTROLLING BOOT DISPLAY, AND NON-VOLATILE COMPUTER-READABLE STORAGE MEDIUM

This application is a U.S. national stage of international application No. PCT/CN2021/139791, field on Dec. 20, 2021, which claims priority to Chinese Patent Application No. 202011565598.0, filed on Dec. 25, 2020, and entitled "METHOD AND SYSTEM FOR CONTROLLING BOOT DISPLAY OF VEHICLE," the contents of which are herein incorporated by reference in their entireties.

TECHNICAL FIELD

The present disclosure relates to the field of vehicle technologies, and in particular, relates to a method and a device for controlling boot display, and a non-volatile computer-readable storage medium.

BACKGROUND OF THE INVENTION

With the continuous developments of vehicle technologies, people are paying more attention on the ride experience. To satisfy the need for a better ride experience, it is desirable to have a method to control display of a boot screen of a vehicle.

SUMMARY OF THE INVENTION

Various embodiments of the present disclosure provide a method and a device for controlling boot display, and a non-volatile computer-readable storage medium.

The embodiments of the present disclosure further provide a system for controlling boot display using the method for controlling boot display.

The method includes: acquiring a start-up signal of a vehicle; acquiring configuration information of the vehicle; acquiring a determination result for the configuration information based on the configuration information; calling out a display mode corresponding to the determination result; driving display on a screen in accordance with the display mode.

In some embodiments, the configuration information includes first configuration information, and the display mode includes a video mode. In response to the determination result being the first configuration information, the screen is driven to operate in accordance with the video mode to display a video.

In some embodiments, the configuration information includes second configuration information, and the display mode includes a picture mode. In response to the determination result being the second configuration information, the screen is driven to operate in accordance with the picture mode to display a picture.

In some embodiments, in response to the determination result being the first configuration information, a thread is created and started; the screen is initialized; whether the thread is connected to the screen is detected; and the screen is driven to display the video or the picture based on the detection result.

In some embodiments, in response to detecting that the thread is successfully connected to the screen, the screen is driven to display the video; or in response to detecting that the thread fails to be connected to the screen, the screen is driven to display the picture.

In some embodiments, in response to detecting that the thread is successfully connected to the screen, a player is initialized; a communication mode between different threads is acquired; and the player is driven to play back the video in accordance with the communication mode.

In some embodiments, in the communication mode, one of the threads is communicated with all the other threads, or one of the threads is communicated with another of the threads.

In some embodiments, in the case that one of the threads transmits video information to the connected screen, the thread transmits the video information to the other threads for synchronous or delayed display of the video.

In some embodiments, the method further includes: acquiring display information of the screen; determining, based on the display information, whether the display of the screen ends; in the case that the display ends, the boot of the vehicle ends; and otherwise, the display of the screen continues.

Various embodiments of the present disclosure further provide a system for controlling boot display using the method for controlling boot display as described above.

The system includes: a first detecting element, a second detecting element, a determining module, a display module, and a control module. The first detecting element is configured to acquire a start-up signal of a vehicle. The second detecting element is configured to acquire configuration information of the vehicle. The determining module is configured to acquire a determination result for the configuration information based on the configuration information. The display module is configured to call out a display mode corresponding to the determination result. The control module is configured to drive the screen to display videos or pictures in accordance with the display mode.

Various embodiments of the present disclosure provide a method and a device for controlling boot display, and a non-volatile computer-readable storage medium. The technical solutions are as follows.

In one aspect, various embodiments of the present disclosure provide a method for controlling boot display. The method includes: acquiring configuration information of a vehicle in response to receiving a start-up signal of the vehicle; determining a display mode matching the configuration information; acquiring a boot animation corresponding to the display mode; and driving a screen of the vehicle to display the boot animation in accordance with the display mode.

In some embodiments, the configuration information includes first configuration information, wherein a display mode matching the first configuration information is a video mode, and a boot animation corresponding to the video mode is a video; and driving the screen of the vehicle to display the boot animation in accordance with the display mode includes: driving the screen of the vehicle to display the video in accordance with the video mode.

In some embodiments, the configuration information includes second configuration information, wherein a display mode matching the second configuration information is a picture mode, and a boot animation corresponding to the picture mode is a picture; and driving the screen of the vehicle to display the boot animation in accordance with the display mode includes: driving the screen of the vehicle to display the picture in accordance with the picture mode.

In some embodiments, the vehicle includes a plurality of screens, and the display mode matching the configuration information corresponds to a plurality of boot animations; and driving the screen of the vehicle to display the boot animation in accordance with the display mode includes: driving the plurality of screens of the vehicle to display corresponding boot animations in accordance with the display mode, wherein the boot animations corresponding to the plurality of screens are different.

In some embodiments, the vehicle includes a plurality of screens; and driving the screen of the vehicle to display the boot animation in accordance with the display mode includes: creating and starting a plurality of threads, wherein each of the threads corresponds to each of the screens; and driving the plurality of screens of the vehicle to display the boot animation in accordance with the display mode in response to each of the threads being successfully connected to the screen corresponding to the thread.

In some embodiments, the method further includes: changing the display mode to a picture mode in response to a connection failure between any of the threads and the screen corresponding to the thread and the display mode matching the configuration information being a video mode, wherein a boot animation corresponding to the picture mode is a picture; and driving the plurality of screens of the vehicle to display the picture in accordance with the picture mode.

In some embodiments, driving the plurality of screens of the vehicle to display the boot animation in accordance with the display mode in response to each of the threads being successfully connected to the screen corresponding to the thread includes: initializing a plurality of players, wherein each of the players corresponds to each of the screens; determining a communication mode between the plurality of threads; and driving the plurality of players to play back the boot animation in accordance with the communication mode between the plurality of threads, such that the screens corresponding to the plurality of players display the boot animation.

In some embodiments, the communication mode includes a first communication mode, wherein in the first communication mode, a first thread is communicated with all second threads simultaneously, the first thread being any of the plurality of threads and the second thread being any of the plurality of threads other than the first thread; and driving the plurality of players to play back the boot animation in accordance with the communication mode between the plurality of threads such that the screens corresponding to the plurality of players display the boot animation includes: transmitting the boot animation by the first thread to a first screen corresponding to the first thread and driving a first player corresponding to the first screen to play back the boot animation, such that the first screen displays the boot animation; and transmitting the boot animation by the first thread to all the second threads, transmitting the boot animation by the second threads to second screens corresponding to the second threads, and driving second players corresponding to the second screens to play back the boot animation, such that the second screens display the boot animation.

In some embodiments, the communication mode includes a second communication mode, wherein in the second communication mode, a first thread is communicated with one of second threads, wherein the first thread is any of the plurality of threads, and the second thread is any of the plurality of threads other than the first thread; and driving the plurality of players to play back the boot animation in accordance with the communication mode between the plurality of threads such that the screens corresponding to the plurality of players display the boot animation includes: transmitting the boot animation by the first thread to the first screen corresponding to the first thread and driving a first player corresponding to a first screen to play back the boot animation, such that the first screen displays the boot animation; and transmitting the boot animation by the first thread to the second thread, transmitting the boot animation by the second thread to a second screen corresponding to the second thread, and driving a second player corresponding to the second screen to play back the boot animation, such that the second screen displays the boot animation.

In some embodiments, the method further includes: receiving a display instruction of other information; and controlling the screen to display the other information in response to an end of display of the boot animation of the screen.

In some embodiments, the method further includes: acquiring display information of the screen; and determining that the display of the boot animation of the screen ends in response to the display information including first information; or determining that the display of the boot animation of the screen does not end in response to the display information not including first information.

Additional aspects and advantages of the present disclosure will be given in part in the description hereinafter. Parts of the present disclosure will become apparent from the following description, or from the practice of the present disclosure.

BRIEF DESCRIPTION OF DRAWINGS

The foregoing and/or additional aspects and advantages of the present disclosure will become apparent and easily understood from the following description of the embodiments in conjunction with the accompanying drawings, wherein.

DETAILED DESCRIPTION

Figure 1:
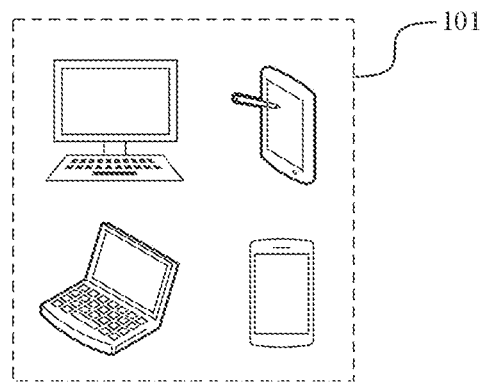
FIG. 1 is a schematic diagram of an implementation environment of a method for controlling boot display according to some embodiments of the present disclosure.

The embodiments of the present disclosure are described in further detail hereinafter, and examples of the embodiments are illustrated in the accompanying drawings. The same or similar reference numerals from beginning to end indicate the same or similar components or components having the same or similar functions. The embodiments described hereinafter with reference to the accompanying drawings are exemplary and are intended only to explain the present disclosure and are not to be construed as any limitation to the present disclosure.

Features proceeded by terms such as "first" and "second" may explicitly or implicitly include one or more of those features. In the description of the present disclosure, unless otherwise specified, the term "a plurality of" refers to two or more.

In the description of the present disclosure, it should be noted that unless otherwise expressly specified and defined, the terms "mounted," "connected," and "coupled" are used in a broad sense, and encompass fixed connections, removable connections, or integrally connections, mechanical connections or electrical connections, direct connections or indirect connections through an intermediate medium, or connections within two components. For those skilled in the art, the specific meanings of the above terms in the present disclosure can be understood according to specific cases.

In some applications, a cockpit system based on the Android system has a native boot animation. When the vehicle is started up, the native boot animation is displayed as a boot animation. The display principle of the native boot animation is de-painting rendering one picture after another picture in a slide show pattern, such that a visual effect of animation is achieved.

In addition, the native boot animation only supports outputting the same boot animation at the same time. As a result, the native boot animation can only be displayed in a limited way and the display effect is not satisfying.

FIG. 1 is a schematic diagram of an implementation environment of a method for controlling boot display according to some embodiments of the present disclosure. As illustrated in FIG. 1, the implementation environment involves an electronic device 101. The electronic device 101 is an in-vehicle terminal installed and run on a vehicle, or a device capable of remotely controlling an in-vehicle terminal of a vehicle, which is not limited herein.

The electronic device 101 is at least one of a smartphone, a desktop computer, a tablet computer, an in-vehicle terminal, and a portable laptop computer. The electronic device 101 is configured to perform the method for controlling boot display according to the embodiments of the present disclosure.

The electronic device 101 generally refers to one of a plurality of electronic devices. In the embodiments, the electronic device 101 is merely used as an example for description. Those skilled in the art should understand that more or fewer electronic devices 101 may be provided. For example, only one electronic device 101 is provided, or dozens or hundreds of electronic devices 101 or even more may be provided. The number and the type of electronic devices are not limited in the embodiments of the present disclosure.

The method for controlling boot display according to some embodiments of the present disclosure is described hereinafter with reference to FIG. 2.

Figure 2:
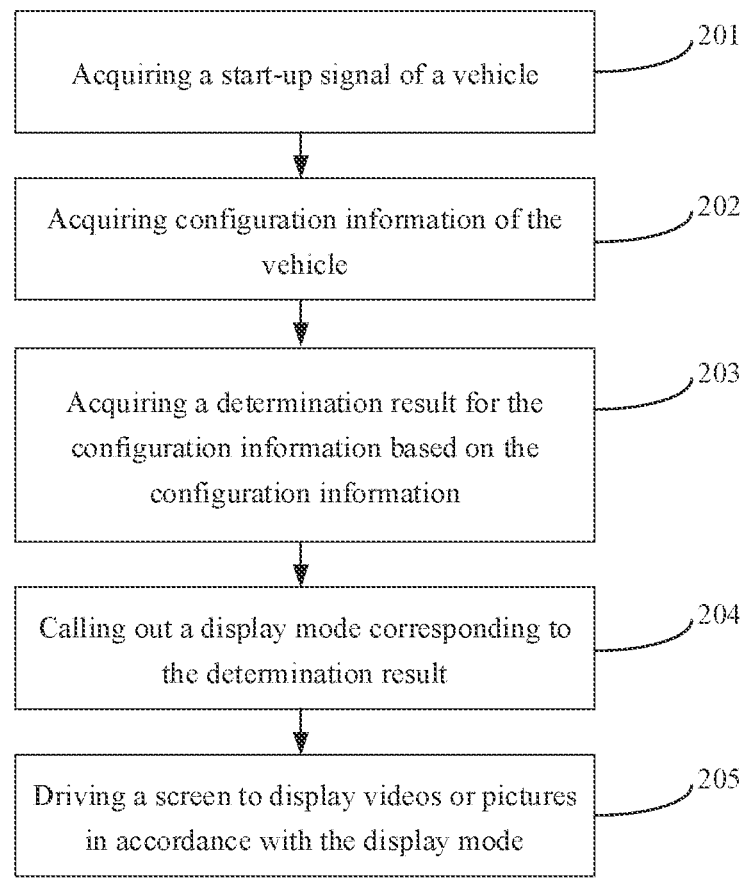
FIG. 2 is a flowchart of a method for controlling boot display according to some embodiments of the present disclosure.

As illustrated in FIG. 2, the method for controlling boot display according to some embodiments of the present disclosure includes: in step 201, acquiring a start-up signal of a vehicle; in step 202, acquiring configuration information of the vehicle; in step 203, acquiring a determination result for the configuration information based on the configuration information; in step 204, calling out a display mode corresponding to the determination result; and in step 205, driving a screen to display videos or pictures in accordance with the display mode.

In some embodiments, the vehicle is started up first. In the case that the vehicle is started up and a detecting element acquires the start-up signal of the vehicle, a preset program of the vehicle is read and the configuration information of boot display of the vehicle is acquired. Then, whether boot display of the vehicle supports video playback is determined based on the configuration information. In the case that it is determined that boot display of the vehicle supports video playback, a display mode that supports video playback is called out, and the screen is controlled to display a video. In the case that it is determined that boot display of the vehicle does not support video playback, a display mode that supports picture playback is called out, and the screen is controlled to display a picture. The picture herein includes an animated picture, and when displaying pictures, the screen is capable of displaying a movable logo of the vehicle.

Upon reading the configuration information, a configuration information variable is predefined. In the case that the configuration information variable is 1, the vehicle supports video playback when started up. In the case that the configuration information variable is 0, the vehicle does not support video playback when started up.

By the method for controlling boot display according to some embodiments of the present disclosure, the screen is caused to display videos or pictures by reading and determining the configuration information of the vehicle. When displaying videos, the screen has a high fluency. In addition, a plurality of screens are provided, and when the vehicle is started up, the user's experience is improved by displaying videos on the plurality of screens. Furthermore, due to the connections between the plurality of screens, the plurality of screens are capable of creating an environment such as constantly falling raindrops or waves, which creates a cool visual effect in the boot of the vehicle.

In some embodiments, the configuration information includes first configuration information, and the display mode includes a video mode. In response to the determination result being the first configuration information, the screen is driven to operate in accordance with the video mode to display a video. In this way, in response to the configuration information being read as the first configuration information, the video mode is directly called out, and under the video mode, a control module drives the screen to display the video.

In some embodiments, the configuration information includes second configuration information, and the display mode includes a picture mode. In response to the determination result being the second configuration information, the screen is driven to operate in accordance with the picture mode to display a picture. That is, in response to the configuration information of the vehicle being the second configuration information, boot display of the vehicle does not support video playback, and the control module drives the screen to display the picture.

In some embodiments, in response to the determination result being the first configuration information, the method includes: creating and starting a thread; initializing the screen; detecting whether the thread is connected to the screen; and driving the screen to display based on the detection result. Further, in response to detecting a successful connection between the thread and the screen, the screen is driven to display the video; and in response to detecting a failed connection between the thread and the screen, the screen is driven to display the picture.

That is, the screen displays the video only in the case that the thread is successfully connected to (communicated with) the screen, but the screen displays the picture in response to the thread being not successfully connected to the screen.

That is, the screen needs to display data regardless of whether the thread is successfully connected to the screen or not. Therefore, the screen needs to be initialized upon or prior to creating the thread, such that the screen displays the video or picture. In addition, the thread transmits the video to the screen, but the picture is transmitted to the screen without the need of the thread.

In some embodiments, in response to detecting that the thread is successfully connected to the screen, a player is initialized, a communication mode between different threads is acquired, and the player is driven to display the video based on the communication mode. That is, in the case that playback of a video is needed, the player is initialized first, such that the video is played back by the player. In addition, the plurality of different threads need to interact and "communicate" with each other. In some embodiments, the communication modes include: one of the threads being communicated with all the other threads at the same time and one of the threads being communicated with another thread.

In the case that one of the threads is communicated with all the other threads at the same time, that is, the thread directly transmits information to all the threads simultaneously and other threads are capable of receiving the information. Upon receiving the information, all the other threads are capable of controlling the connected screens to display the video. In addition, each of the threads is connected to each of the screens, such that each of the threads controls each of the screens to display the video. In some embodiments, in the case that a thread 1 #transmits a video to a connected screen 1 #, the 1#thread transmits messages to all the other threads, such that all the other threads control, upon receiving the messages, the connected screens to display the video synchronized with the screen 1 #. Because each of the screens is controlled by a different thread, the contents of the videos displayed by the screens are the same or different. In addition, upon receiving the information transmitted by the 1 #thread, other threads may control the screens to delay playback of the video, and the delay duration of each thread is controlled by the control module. That is, the delay durations of the threads are the same or different. When the delay durations of the threads are different, each of the screens starts to display the video at a different point in time.

In the case that one of the threads is communicated with another thread, that is, a thread transmits information to only one of the threads and cannot communicate with two or more threads at the same time, the communications between the plurality of threads form a serial communication mode.

In some embodiments, in the case that one of the threads transmits the video information to a connected screen, the thread transmits the video information to other threads for synchronous or delayed display of the video.

Therefore, in the case that a thread is about to control a screen to display a video, the thread transmits information to another thread, and another thread controls the connected screen upon receiving the information, such that the two screens are capable of displaying the video together. Alternatively, upon receiving the information, another thread delays for a period of time and then controls the connected screen to display the video. Therefore, for example, in the case that one screen displays a video of rolling waves, another screen continues to display waves following the amplitude of the previous waves, such that a visual effect of waves rolling from one screen to another is created, which creates a cool visual effect in the boot of the vehicle.

In some embodiments, the method for controlling boot display further includes: acquiring display information of the screen; determining, based on the display information, whether the display of the screen ends; and in the case that the display of the screen ends, the boot of the vehicle is completed, and otherwise, the screen continues to display the video.

The screen needs to display other information, such as map information, in the case that the playback of the boot video is completed. Therefore, whether the playback of the video ends needs to be detected. Only upon ending of playback, the control module controls the screen to display other information. In the case that the playback is not completed, the video continues to be displayed. In addition, the detection of video playback is performed in real-time or after a certain interval, which is not limited herein.

Figure 3:
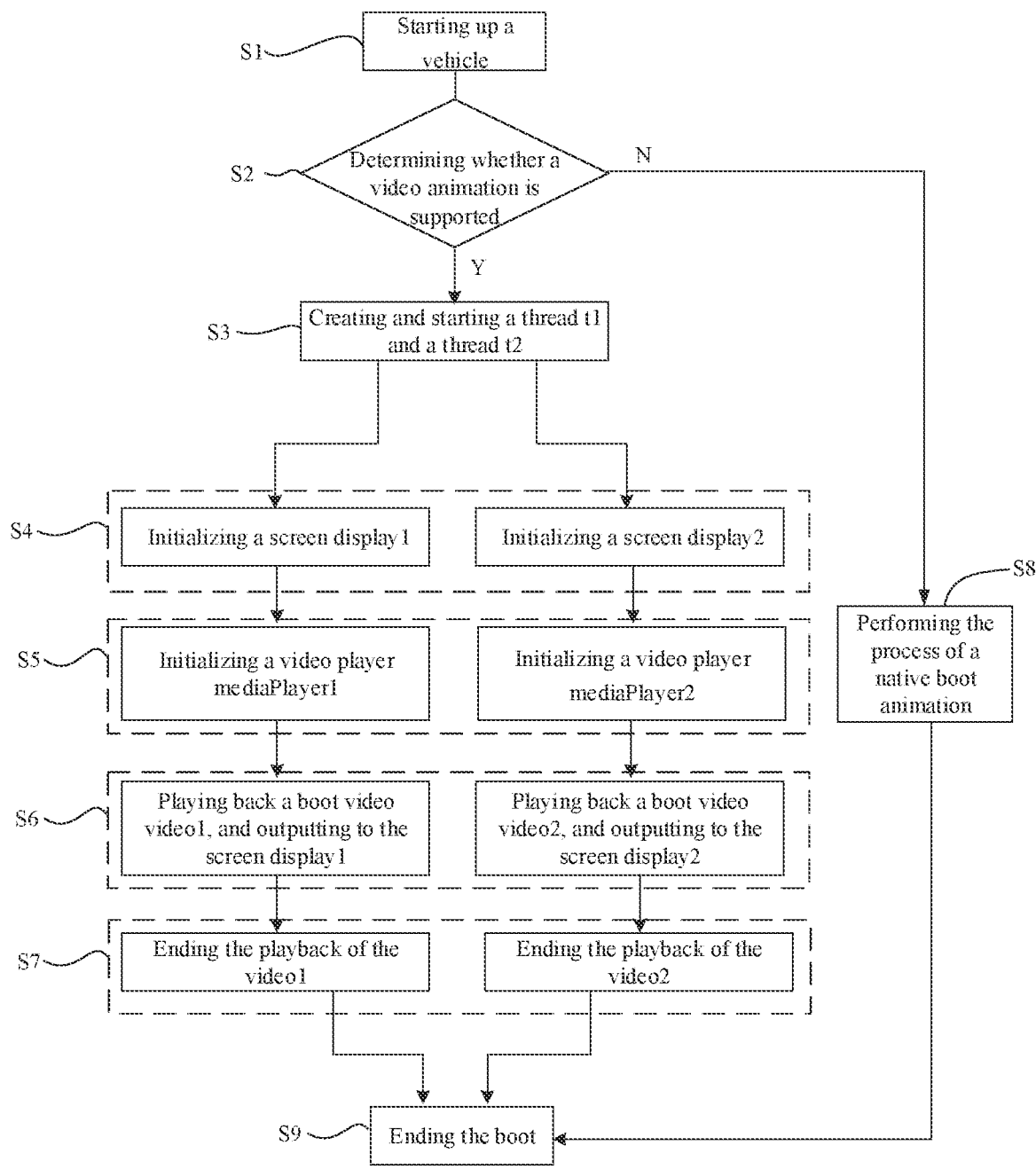
FIG. 3 is a flowchart of a method for controlling boot display according to some embodiments of the present disclosure.

In conjunction with the flowchart of the method for controlling boot display illustrated in FIG. 2, some embodiments of the present disclosure provide a flowchart of a method for controlling boot display. As illustrated in FIG. 3, the description is given using a scenario where two threads are created, and the two threads are respectively connected to two screens as an example. The method includes the following steps.

In step S1, a vehicle is started up.

In step S2, whether a video animation is supported is detected and determined. In the case that the video animation is supported, step S3 is performed; otherwise, step S8 is performed.

In step S3, a thread t1 and a thread t2 are created and started.

In step S4, a screen display1 and a screen display2 are initialized. The thread t1 is connected to and communicated with the screen display 1, and the thread t2 is connected to and communicated with the screen display 2.

In step S5, a video player mediaPlayer1 and a video player mediaPlayer2 are initialized.

In step S6, a boot video video1 is played back and output to the screen display 1, and a boot video video2 is played back and output to the screen display2.

The contents of the video1 and the video2 are the same or different. Playback of the video1 is concurrent with playback of the video2 or delayed relative to the playback of the video 2.

In step S7, the playback of the video1 and the playback of the video2 end.

In step S8, the process of a native boot animation is performed.

The screen only displays pictures or picture animations, not videos.

In step S9, the boot ends.

Some embodiments of the present disclosure further provide a system for controlling boot display using the method for controlling boot display as described above.

The system for controlling boot display according to some embodiments of the second aspect of the present disclosure includes: a first detecting element, a second detecting element, a determining module, a display module, and a control module. The first detecting element is configured to acquire a start-up signal of a vehicle. The second detecting element is configured to acquire configuration information of the vehicle. The determining module acquires a determination result for the configuration information based on the configuration information. The display module calls out a display mode corresponding to the determination result. The control module drives a screen to display pictures or videos in accordance with the display mode.

The vehicle is started up first. In the case that the vehicle is started up and the first detecting element acquires the start-up signal of the vehicle, the second detecting element acquires the configuration information of boot display of the vehicle by reading a pre-set program of the vehicle. The determining module determines whether boot display of the vehicle supports video playback based on the configuration information. In the case that boot display of the vehicle supports video playback, the display module calls out a display mode supporting video playback. Then the control module controls the screen to display a video. In the case that boot display of the vehicle does not support video playback, the display module calls out a display mode supporting picture playback. Then the control module controls the screen to display a picture. The picture herein includes the animated picture, and when displaying the picture, the screen is capable of displaying a movable logo of the vehicle.

The second detecting element, when reading the configuration information, pre-defines a configuration information variable. In the case that the configuration information variable is 1, the vehicle supports video playback when started up. In the case that the configuration information variable is 0, the vehicle does not support video playback when started up.

By the system for controlling boot display according to some embodiments of the present disclosure, the screen is caused to display videos or pictures by reading and determining the configuration information of the vehicle by the second detecting element. When displaying videos, the screen has a high fluency. In addition, a plurality of screens are provided, and when the vehicle is started up, the user's experience is improved by displaying videos on the plurality of screens. Furthermore, due to the connections between the plurality of screens, the plurality of screens are capable of creating an environment such as constantly falling raindrops or waves, which creates a cool visual effect in the boot of the vehicle.

Figure 4:
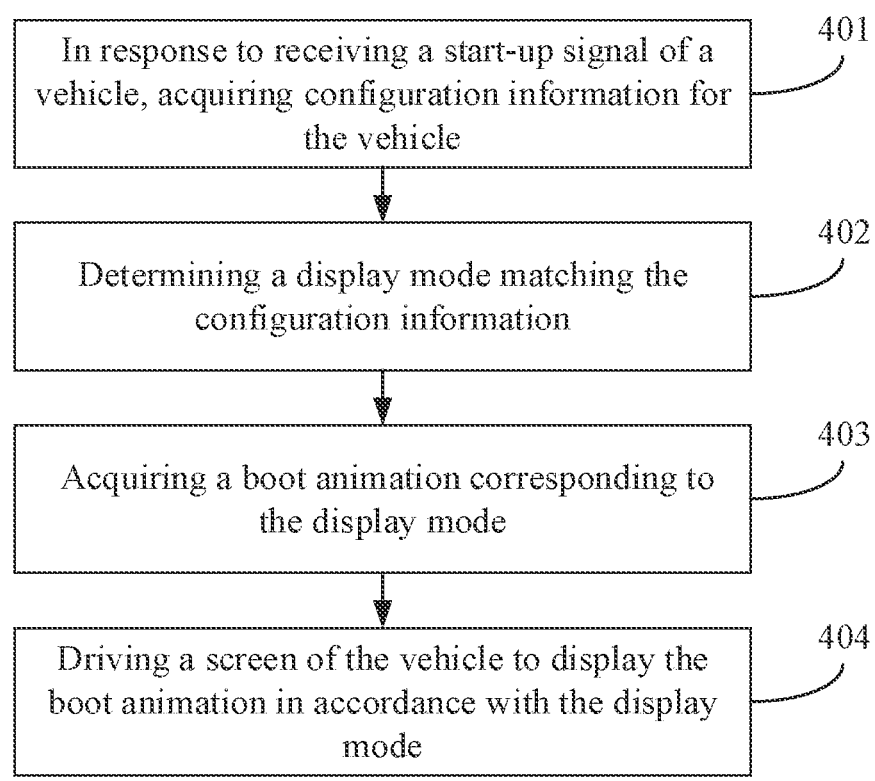
FIG. 4 is a flowchart of a method for controlling boot display according to some embodiments of the present disclosure.

FIG. 4 is a flowchart of a method for controlling boot display according to some embodiments of the present disclosure. The method for controlling boot display according to some embodiments of the present disclosure is described hereinafter with reference to FIG. 4.

As illustrated in FIG. 4, the method includes the following steps 401 to 404.

In step 401, in response to receiving a start-up signal of a vehicle, configuration information for the vehicle is acquired.

In some embodiments, an electronic device is capable of acquiring the start-up signal of the vehicle. The start-up signal of the vehicle indicates, not exclusively, a door of the vehicle being pulled open, and the vehicle being unlocked. Exemplarily, in the case that the start-up signal of the vehicle indicates that the vehicle is unlocked, in response to the vehicle being unlocked, the vehicle is started up, and the electronic device reads a program pre-defined in the vehicle upon acquiring the start-up signal of the vehicle, and acquires the configuration information of the vehicle. The configuration information is configured to determine a display mode of a boot animation of the vehicle.

The configuration information includes first configuration information and second configuration information. Exemplarily, the first configuration information is 1 and the second configuration information is 0.

In step 402, a display mode matching the configuration information is determined.

In some embodiments, the display mode includes a video mode and a picture mode. In the case that the configuration information is the first configuration information, a display mode matching the first configuration information is the video mode. In the case that the configuration information is the second configuration information, a display mode matching the second configuration information is the picture mode.

In step 403, a boot animation corresponding to the display mode is acquired.

In some embodiments, in the case that the display mode is the video mode, a boot animation corresponding to the video mode is a video; and in the case that the display mode is the picture mode, a boot animation corresponding to the picture mode is a picture. The video is of any length, which is not limited herein. The picture is a static picture or an animated picture, which is not limited herein. For example, the picture is a static logo of the vehicle, and for example, the picture is a movable logo of the vehicle, that is, a dynamic logo.

In step 404, a screen of the vehicle is driven to display the boot animation in accordance with the display mode.

In some embodiments, in response to the configuration information of the vehicle being the first configuration information, the display mode is determined to be the video mode. A video corresponding to the video mode is acquired, and the screen of the vehicle is driven to display the video in accordance with the video mode. Therefore, in response to the read configuration information of the vehicle being the first configuration information, the video mode is directly called out. Under the video mode, the screen of the vehicle is driven to display the video.

In some embodiments, in response to the configuration information of the vehicle being the second configuration information, the display mode is determined to be the picture mode. A picture corresponding to the picture mode is acquired, and the screen of the vehicle is driven to display the picture in accordance with the picture mode. That is, in the case that the configuration information of the vehicle is the second configuration information, boot display of the vehicle does not support video playback, and the display mode is determined as the picture mode. Under the picture mode, the screen of the vehicle is driven to display the picture.

In some embodiments, the vehicle includes a plurality of screens, and the display mode matching the configuration information corresponds to a plurality of boot animations. Thus, the plurality of screens of the vehicle are driven to display corresponding boot animations in accordance with the display mode, and the plurality of screens correspond to different boot animations. The process includes: creating and starting a plurality of threads, wherein each of the threads corresponds to each of the screens; determining the boot animation corresponding to each of the screens; and transmitting the boot screen corresponding to each of the screens by the thread corresponding to the screen. The time points for transmitting the corresponding boot screens to the screens by the corresponding threads are the same or not, which is not limited herein.

In some embodiments, the vehicle includes three screens and has three boot screens. A boot screen 1 corresponds to a screen 1, a boot screen 2 corresponds to a screen 2, and a boot screen 3 corresponds to a screen 3. The screen 1 corresponds to a thread 1, the screen 2 corresponds to a thread 2, and the screen 3 corresponds to a thread 3. A boot screen 1 is transmitted to the screen 1 by the thread 1, such that the screen 1 displays the boot screen 1. A boot screen 2 is transmitted to the screen 2 by the thread 2, such that the screen 2 displays the boot screen 2. A boot screen 3 is transmitted to the screen 3 by the thread 3, such that the screen 3 displays the boot screen 3.

The vehicle may include a plurality of screens. Driving the screens of the vehicle to display the boot animation in accordance with the display mode includes: creating and starting a plurality of threads, wherein each of the threads corresponds to each of the screens; and in response to each of the threads being successfully connected to each of the screens, driving the plurality of screens of the vehicle to display the boot animation in accordance with the display mode. The number of threads is the same as the number of screens.

In some embodiments, in the case that a connection failure occurs between any of the threads and the corresponding screen and the display mode matching the configuration information is the video mode, the display mode is changed to the picture mode. The boot animation corresponding to the picture mode is a picture, and the plurality of screens of the vehicle are driven to display the picture in accordance with the picture mode.

That is, in the case that the display mode is the video mode, the plurality of screens of the vehicle are driven to display the boot animation in accordance with the video mode only when each of the threads is successfully connected to (communicated with) the corresponding screen. However, in the case that any of the threads fails to be connected to the corresponding screen, the display mode fails to be the video mode. In this case, the display mode is changed to the picture mode to drive the plurality of screens of the vehicle to display pictures in accordance with the picture mode. That is, the screens need to display the boot animation regardless of whether the threads are successfully connected to the corresponding screens, and therefore the screens need to be initialized upon or prior to creating the threads, such that the screens display videos or pictures. The timing of initializing the screens is not limited herein.

It should be noted that in the case that the display mode is the video mode, the video needs to be transmitted to the screen by the thread; and in the case that the display mode is the picture mode, the picture is transmitted to the screen by the thread or not by the thread. Therefore, in response to a connection failure between any of the threads and the corresponding screen and the display mode being the video mode, the display mode is changed to the picture mode.

In some embodiments, in the case that there is only one boot animation and each of the threads is successfully connected to the corresponding screen, the process of driving the plurality of screens of the vehicle to display the boot animation in accordance with the display mode includes: initializing a plurality of players, wherein each of the players corresponds to each of the screens; determining a communication mode between the plurality of threads; and driving the plurality of players to play back the boot animation based on the communication mode between the plurality of threads, such that the screens corresponding to the plurality of players display the boot animation. That is, in the case that the boot animation needs to be played back, the players are initialized first, such that the boot animation is displayed on the screen on the players. Furthermore, the plurality of different threads need to interact and "communicate" with each other.

In some embodiments, the communication modes between the different threads include: a first communication mode and a second communication mode. In the first communication mode, a first thread is communicated with all second threads simultaneously, and in the second communication mode, the first thread is communicated with one of the second threads. The first thread is any of the plurality of threads, and the second thread is any of the plurality of threads other than the first thread.

In the case that the communication mode is the first communication mode, the process of driving the plurality of players to play back the boot animation based on the communication mode between the plurality of threads such that the screens corresponding to the plurality of players display the boot animation includes: transmitting the boot animation by the first thread to a first screen corresponding to the first thread and driving a first player corresponding to the first screen to play back the boot animation, such that the first screen displays the boot animation; and transmitting the boot animation by the first thread to all the second threads; transmitting the boot animation by the second threads to second screens corresponding to the second threads; and driving second players corresponding to the second screens to play back the boot animation, such that the second screens display the boot animation.

That is, a thread is capable of transmitting the boot animation directly to all the other threads at the same time and causing all the other threads to receive the boot animation. Upon receiving the boot animation, all the other threads drive the connected players to play back the boot animation, thereby causing the screens connected to all the other threads to display the boot animation.

In some embodiments, the description is given using a scenario where the display mode is the video mode, the boot animation is a video, and three threads are used as an example. A screen 1 #is caused to display the video by transmitting the video by a thread 1 #to the screen 1 #corresponding to the thread 1 #and driving a player 1 #corresponding to the screen 1 #to play back the video. The thread 1 #transmits the video to the thread 2 #and the thread 3 #at the same time. The thread 2 #and the thread 3 #receive the video at the same time. A screen 2 #is caused to display the video by transmitting the video by the thread 2 #to the screen 2 #corresponding to the thread 2 #and driving a player 2#corresponding to the screen 2 #to play back the video. A screen 3 #is caused to display the video by transmitting the video by the thread 3 #to the screen 3 #corresponding to the thread 3 #and driving a player 3 #corresponding to the screen 3 #to play back the video.

Each of the screens is controlled by a different thread, and thus the screens are capable of displaying the video at the same or different points in time. The screen 1 #, the screen 2 #, and the screen 3 #are capable of displaying the video at the same time or delaying the playback of the video. In some embodiments, upon receiving the video transmitted by the thread 1 #, the thread 2 #delays the control of the player corresponding to the thread 2 #to play back the video, and thus the screen 2#delays the display of the video. The delay durations of the threads are the same or different. In the case that the delay durations of the threads are different, each of the screens starts the playback of the video at a different point in time.

In the case that the communication mode is the second communication mode, the process of driving the plurality of players to play back the boot animation based on the communication mode between the plurality of threads such that the screens corresponding to the plurality of players display the boot animation includes: transmitting the boot animation by the first thread to a first screen corresponding to the first thread and driving a first player corresponding to the first screen to play back the boot animation, such that the first screen displays the boot animation; and transmitting the boot animation by the first thread to the second thread, transmitting the boot animation by the second thread to a second screen corresponding to the second thread, and driving a second player corresponding to the second screen to play back the boot animation, such that the second screen displays the boot animation.

That is, a thread is capable of transmitting the boot animation to only another thread and fails to transmit the boot animation to two or more threads at the same time. A serial communication mode functions between the plurality of threads.

In some embodiments, the description is given using a scenario where the display mode is the video mode, the boot animation is a video, and there are three threads as an example. A screen 1 #is caused to display the video by transmitting the video by a thread 1 #to the screen 1 #corresponding to the thread 1 #and driving a player 1 #corresponding to the screen 1 #to play back the video. The thread 1 #transmits the video to the thread 2 #. Upon receiving the video, the thread 2 #transmits the video to a screen 2 #corresponding to the thread 2 #, and drives a player 2 #corresponding to the screen 2 #to play back the video, such that the screen 2 #displays the video. The thread 2 #transmits the video to a thread 3 #. Upon receiving the video, the thread 3 #transmits the video to a screen 3 #corresponding to the thread 3 #, and drives a player 3 #corresponding to the screen 3 #to play back the video, such that the screen 3 #displays the video.

In some embodiments, in the case that the first thread transmits the boot animation to a second thread communicated with the first thread, the second thread transmits the boot animation to a third thread communicated with the second thread. A first screen corresponding to the first thread, a second screen corresponding to the second thread, and a third screen corresponding to the third thread synchronously display the boot animation or delay the display of the boot animation.

Therefore, in the case that a thread is about to control the corresponding screen to display the boot animation, the thread transmits the boot animation to another thread, and the another thread controls the connected screen upon receiving the boot animation, such that the two screens are capable of displaying the boot animation together. Alternatively, upon receiving the boot animation, the another thread delays for a period of time and then controls the connected screen to display the boot animation. Thus, the two screens display the boot animation at different points in time, which creates an effect that the two screens display different boot animations.

In some embodiments, in the case that one screen displays a video of 10 seconds of rolling waves at the time 10:10:10 (i.e., ten ten ten seconds), another screen displays the video of rolling waves at time 10:10:20 (i.e., ten ten twenty seconds), such that an effect of the waves rolling from one screen to another screen is created, which creates a cool visual effect in the boot of the vehicle.

In some embodiments, in the case that any of the threads fails to be connected to the corresponding screen and the display mode corresponding to the configuration information is the video mode, the display mode is changed to the picture mode. A picture corresponding to each of the screens is stored in a storage space corresponding to the screen, and thus each of the screens extracts the corresponding picture from the corresponding storage space and displays the picture. The pictures stored in the storage space corresponding to the screens are the same or different, which is not limited herein.

In some embodiments, in the case that each of the threads is successfully connected to the corresponding screen, and the display mode corresponding to the configuration information is the picture mode, the picture is transmitted to the screen by the thread and displayed on the screen. Alternatively, the picture is displayed on the screen by extracting the picture corresponding to each screen from the corresponding storage space. The way of displaying the picture is not limited herein.

In some embodiments, in the case that each of the threads is successfully connected to the corresponding screen and the display mode corresponding to the configuration information is the video mode, the video is displayed by driving the plurality of screens in the following manner. A video corresponding to each of the screens is stored in a storage space corresponding to the screen, and thus each of the screens extracts the corresponding video from the corresponding storage space and displays the video. The videos stored in the storage space corresponding to the screens are the same or different, which is not limited herein.

In some embodiments, the method for controlling boot display further includes: receiving a display instruction of other information; and controlling the screen to display the other information in response to an end of the display of the boot animation of the screen.

The process of determining whether boot display of the screen ends includes: acquiring display information of the screen; and determining, in response to the display information including the first information, that the display of the boot animation of the screen ends; or determining, in response to the display information not including the first information, that the boot animation of the screen does not end.

In some embodiments, the screen is controlled to continue displaying the boot animation in the case that the display of the boot animation of the screen does not end.

Other information is not limited herein. For example, the other information is map information. The first information includes information indicating the time, and the first information also includes the other information, which is not limited herein.

In some embodiments, in response to receiving the display instruction of the other information, whether the display of the boot animation of the screen ends is determined immediately or upon a specified time period. The time point for determining whether the display of the boot animation of the screen ends is not limited herein.

The method for controlling boot display according to some embodiments of the disclosure drives the screen of the vehicle to display the corresponding boot animation based on the display mode by reading the configuration information of the vehicle and determining the display mode corresponding to the configuration information. In this way, the display mode is diversified, such that the display effect of boot display is better.

In addition, the screen is controlled to display videos or pictures based on the display mode, and when displaying videos, the screen has a high fluency. Because a plurality of screens are provided, when the vehicle is started up, the user's experience is improved by displaying videos on the plurality of screens. Furthermore, due to the connections between the plurality of screens, the plurality of screens are capable of creating an environment such as constantly falling raindrops or waves, which creates a cool visual effect in the boot of the vehicle.

Figure 5:
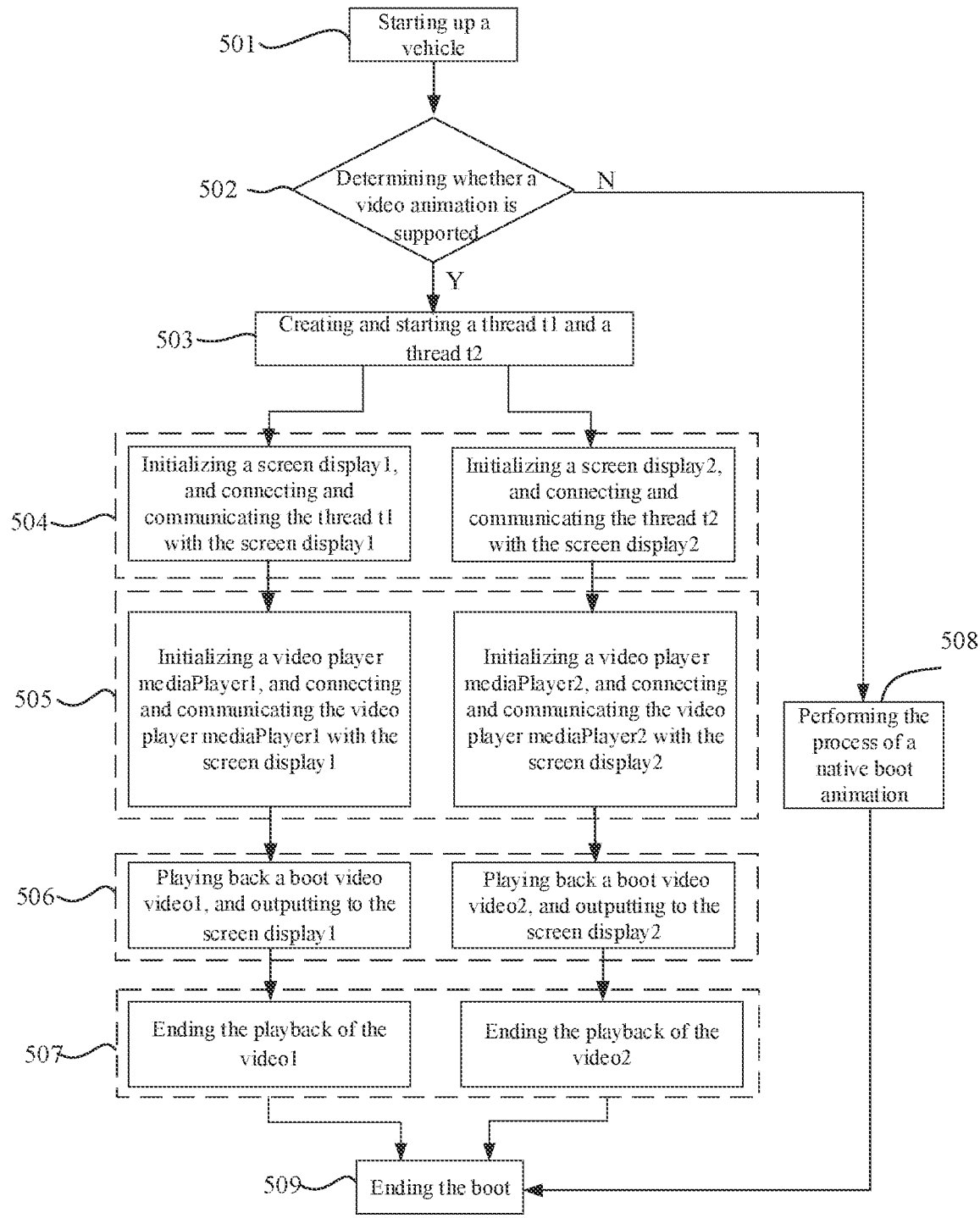
FIG. 5 is a flowchart of a method for controlling boot display according to some embodiments of the present disclosure.

In conjunction with the flowchart of the method for controlling boot display illustrated in FIG. 4, FIG. 5 is a flowchart of a method for controlling boot display according to some embodiments of the present disclosure. The description is given using a scenario where two threads are created and the two threads are respectively connected to two screens as an example. The method includes the following steps.

In step 501, a vehicle is started up.

In step 502, whether the vehicle supports a video animation is determined. In the case that the video animation is supported, step 503 is performed; and otherwise, step 508 is performed.

In step 503, a thread t1 and a thread t2 are created and started.

In step 504, a screen display1 is initialized and a screen display2 is initialized, wherein the thread t1 is connected to and communicated with the screen display1, and the thread t2 is connected to and communicated with the screen display2.

In step 505, a video player mediaPlayer1 is initialized, and a video player mediaPlayer2 is initialized, wherein the video player mediaPlayer1 is connected to and communicated with the screen display1, and the video player mediaPlayer2 is connected to and communicated with the screen display2.

In step 506, a boot video video1 is played back and output to the screen display1, and a boot video video2 is played back and output to the screen display2.

The contents of the video1 and the video2 are the same or different, and playback of the video1 is concurrent with playback of the video2 or delayed relative to the playback of the video 2, which are not limited herein.

In step 507, the playback of the video1 ends, and the playback of the video2 ends.

In step 508, the process of the native boot animation is performed.

The screen only displays pictures or picture animations, not videos.

In step 509, the boot ends.

Figure 6:
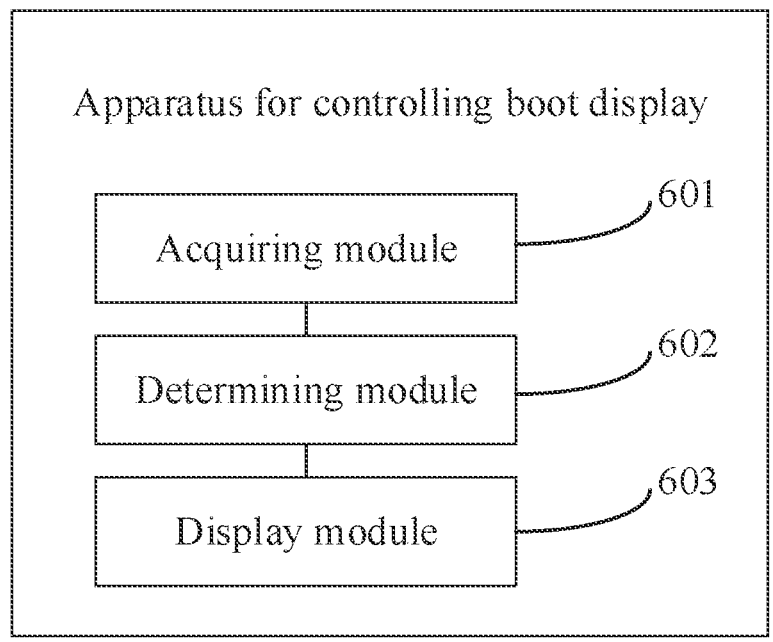
FIG. 6 is a schematic structural diagram of an apparatus for controlling boot display according to some embodiments of the present disclosure.

FIG. 6 is a schematic structural diagram of an apparatus for controlling boot display according to some embodiments of the present disclosure. In FIG. 6, the apparatus includes: an acquiring module 601, configured to acquire, in response to receiving a start-up signal of a vehicle, configuration information of the vehicle; a determining module 602, configured to determine a display mode matching the configuration information; the acquiring module 601 is further configured to acquire a boot animation corresponding to the display mode; and a display module 603, configured to drive a screen of the vehicle to display a boot animation in accordance with the display mode.

In some embodiments, the configuration information includes first configuration information, a display mode matching the first configuration information is a video mode, and a boot animation corresponding to the video mode is a video; and the display module 603 is configured to drive the screen of the vehicle to display the video in accordance with the video mode.

In some embodiments, the configuration information includes second configuration information, a display mode matching the second configuration information is a picture mode, and a boot animation corresponding to the picture mode is a picture; and the display module 603 is configured to drive the screen of the vehicle to display the picture in accordance with the picture mode.

In some embodiments, the vehicle includes a plurality of screens, and the display mode matching the configuration information corresponds to a plurality of boot animations; and the display module 603 is configured to drive the plurality of screens of the vehicle to display the corresponding boot animations in accordance with the display mode, wherein the plurality of screens corresponds to different boot animations.

In some embodiments, the vehicle includes a plurality of screens; and the apparatus further includes: a creating module, configured to create and start a plurality of threads, wherein each of the threads corresponds to each of the screens; and the display module 603 is configured to drive the plurality of screens of the vehicle to display the boot animation in accordance with the display mode in response to each of the threads being successfully connected to each of the screens.

In some embodiments, the apparatus further includes: a change module, configured to change the display mode to the picture mode in response to a connection failure between any of the threads and the corresponding screen and the display mode matching the configuration information being the video mode, wherein the boot animation corresponding to the picture mode is a picture; and the display module 603 is configured to drive the plurality of screens of the vehicle to display the picture in accordance with the picture mode.

In some embodiments, the apparatus further includes: an initializing module, configured to initialize a plurality of players, wherein each of the players corresponds to each of the screens; the determining module 602 is configured to determine a communication mode between the plurality of threads; and the display module 603 is configured to drive the plurality of players to play back the boot animation in accordance with the communication method between the plurality of threads, such that the screens corresponding to the plurality of players display the boot animation.

In some embodiments, the communication mod includes: a first communication mode, wherein in the first communication, a first thread is communicated with all second threads at the same time, wherein the first thread is any of the plurality of threads, and the second thread is any of the plurality of threads other than the first thread; and the display module 603 is configured to transmit the boot animation by the first thread to a first screen corresponding to the first thread and drive a first player corresponding to the first screen to play back the boot animation, such that the first screen displays the boot animation; and transmit the boot animation by the first thread to all the second threads, transmit the boot animation by the second threads to second screens corresponding to the second threads, and drive second players corresponding to the second screens to play back the boot animation, such that the second screens display the boot animation.

In some embodiments, the communication mode includes: a second communication mode, wherein in the second communication, a first thread is communicated with a second thread, wherein the first thread is any of the plurality of threads, and the second thread is any of the plurality of threads other than the first thread; and the display module 603 is configured to transmit the boot animation by the first thread to a first screen corresponding to the first thread and drive a first player corresponding to the first screen to play back the boot animation, such that the first screen displays the boot animation; and transmit the boot animation by the first thread to the second thread, transmit the boot animation by the second thread to a second screen corresponding to the second thread, and drive a second player corresponding to the second screen to play back the boot animation, such that the second screen displays the boot animation.

In some embodiments, the apparatus further includes: a receiving module, configured to receive a display instruction of other information; and the display module 603 is further configured to control the screen to display other information in response to an end of the display of the boot animation of the screen.

In some embodiments, the acquiring module 601 is further configured to acquire display information of the screen; and the determining module 602 is further configured to determine, in response to the display information including the first information, that the display of the boot animation of the screen, ends, or determine, in response to the display information not including the first information, that the display of the boot animation of the screen does not end.

The apparatus for controlling boot display according to some embodiments of the disclosure drives the screen to display the boot animation based on the display mode by reading the configuration information of the vehicle and determining the display mode corresponding to the configuration information. In this way, the display mode is diversified, such that the display effect of boot display is better.

In addition, the screen is controlled to display videos or pictures based on the display mode, and when displaying videos, the screen has a high fluency. Because a plurality of screens are provided, when the vehicle is started up, the user's experience is improved by displaying videos on the plurality of screens. Furthermore, due to the connections between the plurality of screens, the plurality of screens are capable of creating an environment such as constantly falling raindrops or waves, which creates a cool visual effect in the boot of the vehicle.

Figure 7:
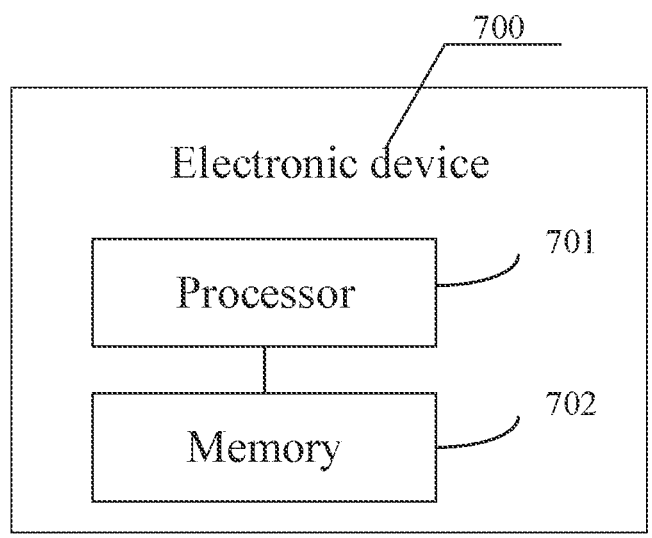
FIG. 7 is a schematic structural diagram of an electronic device according to some embodiments of the present disclosure.

FIG. 7 is a schematic structural diagram of an electronic device according to some embodiments of the present disclosure. The electronic device 700 varies greatly due to the difference of the configuration or performance and includes one or more processors (central processing units, CPUs) 701 and one or more memories 702. The one or more memories 702 stores at least one program code. The at least one program code, when loaded and executed by the one or more processors 701, causes the one or more processors to perform the method for controlling boot display according to the method embodiments as described above. The electronic device 700 also has components such as a wired or wireless network interface, a keyboard, and an input-output interface for input and output. The electronic device 700 includes other components configured to implement functions of the device, which is not repeated herein.

In some embodiments, a computer-readable storage medium is further provided. At least one program code is stored in the computer-readable storage medium. The at least one program code, when loaded and executed by a processor of a computer, causes the computer to perform the method for controlling boot display as described above.

In some embodiments, the computer-readable storage medium may be a read-only memory (ROM), a random access memory (RAM), a compact disc read-only memory (CD-ROM), a magnetic tape, a floppy disk, an optical data storage device, and the like.

In some embodiments, a computer program or computer program product is provided. The computer program or computer program product includes at least one computer instruction. The at least one computer instruction, when loaded and executed by a processor of a computer, causes the computer to perform the method for controlling boot display as described above.

In the description of the specification, the terms "some embodiments," "optionally," "further," "some examples," and the like are intended to mean that the specific features, structures, materials, or characteristics described in connection with the embodiment or example are included in at least one embodiment or example of the present disclosure. In the specification, the schematic description of the above terms does not necessarily refer to the same embodiment or example. Further, the specific features, structures, materials, or characteristics described may be combined in any one or more embodiments or examples in a suitable manner.

Although the present disclosure has been disclosed and described, it should be understood by those skilled in the art that various changes, modifications, substitutions, and variants may be made, without departing from the principles and purposes of the present disclosure. The scope of the present disclosure is defined by the claims and their equivalents.

What is claimed is:

1. A method for controlling boot display, comprising:
   acquiring configuration information of a vehicle in response to receiving a start-up signal of the vehicle;
   determining a display mode matching the configuration information;
   acquiring a boot animation corresponding to the display mode; and
   driving a screen of the vehicle to display the boot animation in accordance with the display mode;
   wherein the vehicle comprises a plurality of screens;
   wherein driving the screen of the vehicle to display the boot animation in accordance with the display mode comprises:
     creating and starting a plurality of threads, wherein each of the threads corresponds to each of the screens; and
     driving the plurality of screens of the vehicle to display the boot animation in accordance with the display mode in response to each of the threads being successfully connected to the screen corresponding to the thread;
   wherein driving the plurality of screens of the vehicle to display the boot animation in accordance with the display mode in response to each of the threads being successfully connected to the screen corresponding to the thread comprises:
     initializing a plurality of players, wherein each of the players corresponds to each of the screens;
     determining a communication mode between the plurality of threads; and
     driving the plurality of players to play back the boot animation in accordance with the communication mode between the plurality of threads, such that the screens corresponding to the plurality of players display the boot animation;
   wherein the communication mode comprises a first communication mode, wherein in the first communication mode, a first thread is communicated with all second threads simultaneously, the first thread being any of the plurality of threads and the second thread being any of the plurality of threads other than the first thread; and
   wherein driving the plurality of players to play back the boot animation in accordance with the communication mode between the plurality of threads such that the screens corresponding to the plurality of players display the boot animation comprises:
     transmitting the boot animation by the first thread to a first screen corresponding to the first thread and driving a first player corresponding to the first screen to play back the boot animation, such that the first screen displays the boot animation; and
     transmitting the boot animation by the first thread to all the second threads, transmitting the boot animation by the second threads to second screens corresponding to the second threads, and driving second players corresponding to the second screens to play back the boot animation, such that the second screens display the boot animation.

2. The method according to claim 1, wherein
the configuration information comprises first configuration information, wherein a display mode matching the first configuration information is a video mode and a boot animation corresponding to the video mode is a video; and
driving the screen of the vehicle to display the boot animation in accordance with the display mode comprises:
driving the screen of the vehicle to display the video in accordance with the video mode.

3. The method according to claim 1, wherein
the configuration information comprises second configuration information, wherein a display mode matching the second configuration information is a picture mode and a boot animation corresponding to the picture mode is a picture; and
driving the screen of the vehicle to display the boot animation in accordance with the display mode comprises:
driving the screen of the vehicle to display the picture in accordance with the picture mode.

4. The method according to claim 1, wherein
the vehicle comprises a plurality of screens, and the display mode matching the configuration information corresponds to a plurality of boot animations; and
driving the screen of the vehicle to display the boot animation in accordance with the display mode comprises:
driving the plurality of screens of the vehicle to display corresponding boot animations in accordance with the display mode, wherein the boot animations corresponding to the plurality of screens are different.

5. The method according to claim 1, further comprising:
changing the display mode to a picture mode in response to a connection failure between any of the threads and the screen corresponding to the thread and the display mode matching the configuration information being a video mode, wherein a boot animation corresponding to the picture mode is a picture; and
driving the plurality of screens of the vehicle to display the picture in accordance with the picture mode.

6. The method according to claim 1, wherein
the communication mode comprises a second communication mode, wherein in the second communication mode, a first thread is communicated with one of second threads, the first thread being any of the plurality of threads and the second thread being any of the plurality of threads other than the first thread; and
driving the plurality of players to play back the boot animation in accordance with the communication mode between the plurality of threads such that the screens corresponding to the plurality of players display the boot animation comprises:
transmitting the boot animation by the first thread to a first screen corresponding to the first thread and driving a first player corresponding to the first screen to play back the boot animation, such that the first screen displays the boot animation; and
transmitting the boot animation by the first thread to the second thread, transmitting the boot animation by the second thread to a second screen corresponding to the second thread, and driving a second player corresponding to the second screen to play back the boot animation, such that the second screen displays the boot animation.

7. The method according to claim 1, further comprising:
receiving a display instruction of other information; and
controlling the screen to display the other information in response to an end of display of the boot animation of the screen.

8. The method according to claim 7, further comprising:
acquiring display information of the screen; and
determining that the display of the boot animation of the screen ends in response to the display information comprising first information; or
determining that the display of the boot animation of the screen does not end in response to the display information not comprising first information.

9. A computer program product, comprising: at least one computer instruction, wherein the at least one computer instruction, when loaded and executed by a processor of a computer, causes the computer to perform the method for controlling boot display as defined in claim 1.

10. A device for controlling boot display, comprising: a processor and a memory storing at least one program code, wherein the processor, when loading and executing the at least one program code, is caused to perform:
acquiring configuration information of a vehicle in response to receiving a start-up signal of the vehicle;
determining a display mode matching the configuration information;
acquiring a boot animation corresponding to the display mode; and
driving a screen of the vehicle to display the boot animation in accordance with the display mode;
wherein the vehicle comprises a plurality of screens; and
wherein driving the screen of the vehicle to display the boot animation in accordance with the display mode comprises:
creating and starting a plurality of threads, wherein each of the threads corresponds to each of the screens; and
driving the plurality of screens of the vehicle to display the boot animation in accordance with the display mode in response to each of the threads being successfully connected to the screen corresponding to the thread;
wherein driving the plurality of screens of the vehicle to display the boot animation in accordance with the display mode in response to each of the threads being successfully connected to the screen corresponding to the thread comprises:
initializing a plurality of players, wherein each of the players corresponds to each of the screens;
determining a communication mode between the plurality of threads; and
driving the plurality of players to play back the boot animation in accordance with the communication mode between the plurality of threads, such that the screens corresponding to the plurality of players display the boot animation;
wherein the communication mode comprises a first communication mode, wherein in the first communication mode, a first thread is communicated with all second threads simultaneously, the first thread being any of the plurality of threads and the second thread being any of the plurality of threads other than the first thread;

wherein driving the plurality of players to play back the boot animation in accordance with the communication mode between the plurality of threads such that the screens corresponding to the plurality of players display the boot animation comprises:
  transmitting the boot animation by the first thread to a first screen corresponding to the first thread and driving a first player corresponding to the first screen to play back the boot animation, such that the first screen displays the boot animation; and
  transmitting the boot animation by the first thread to all the second threads, transmitting the boot animation by the second threads to second screens corresponding to the second threads, and driving second players corresponding to the second screens to play back the boot animation, such that the second screens display the boot animation.

11. The device according to claim 10, wherein
the configuration information comprises first configuration information, wherein a display mode matching the first configuration information is a video mode and a boot animation corresponding to the video mode is a video; and
the at least one program code is caused to perform:
driving the screen of the vehicle to display the video in accordance with the video mode.

12. The device according to claim 10, wherein
the configuration information comprises second configuration information, wherein a display mode matching the second configuration information is a picture mode and a boot animation corresponding to the picture mode is a picture; and
the at least one program code is caused to perform:
driving the screen of the vehicle to display the picture in accordance with the picture mode.

13. The device according to claim 10, wherein
the vehicle comprises a plurality of screens, and the display mode matching the configuration information corresponds to a plurality of boot animations; and
the at least one program code is caused to perform:
driving the plurality of screens of the vehicle to display corresponding boot animations in accordance with the display mode, wherein the boot animations corresponding to the plurality of screens are different.

14. The device according to claim 10, the at least one program code is caused to perform:
changing the display mode to a picture mode in response to a connection failure between any of the threads and the screen corresponding to the thread and the display mode matching the configuration information being a video mode, wherein a boot animation corresponding to the picture mode is a picture; and
driving the plurality of screens of the vehicle to display the picture in accordance with the picture mode.

15. A non-volatile computer-readable storage medium, comprising: at least one program code, wherein the at least one program code, when loaded and executed by a processor of a computer, causes the computer to perform:
acquiring configuration information of a vehicle in response to receiving a start-up signal of the vehicle;
determining a display mode matching the configuration information;
acquiring a boot animation corresponding to the display mode; and
driving a screen of the vehicle to display the boot animation in accordance with the display mode;
wherein the vehicle comprises a plurality of screens; and
wherein driving the screen of the vehicle to display the boot animation in accordance with the display mode comprises:
  creating and starting a plurality of threads, wherein each of the threads corresponds to each of the screens; and
  driving the plurality of screens of the vehicle to display the boot animation in accordance with the display mode in response to each of the threads being successfully connected to the screen corresponding to the thread;
wherein driving the plurality of screens of the vehicle to display the boot animation in accordance with the display mode in response to each of the threads being successfully connected to the screen corresponding to the thread comprises:
  initializing a plurality of players, wherein each of the players corresponds to each of the screens;
  determining a communication mode between the plurality of threads; and
  driving the plurality of players to play back the boot animation in accordance with the communication mode between the plurality of threads, such that the screens corresponding to the plurality of players display the boot animation;
wherein the communication mode comprises a first communication mode, wherein in the first communication mode, a first thread is communicated with all second threads simultaneously, the first thread being any of the plurality of threads and the second thread being any of the plurality of threads other than the first thread; and
wherein driving the plurality of players to play back the boot animation in accordance with the communication mode between the plurality of threads such that the screens corresponding to the plurality of players display the boot animation comprises:
  transmitting the boot animation by the first thread to a first screen corresponding to the first thread and driving a first player corresponding to the first screen to play back the boot animation, such that the first screen displays the boot animation; and
  transmitting the boot animation by the first thread to all the second threads, transmitting the boot animation by the second threads to second screens corresponding to the second threads, and driving second players corresponding to the second screens to play back the boot animation, such that the second screens display the boot animation.

* * * * *